Nov. 10, 1959 R. C. RUSSELL 2,911,852
TORQUE CONVERTERS
Filed March 29, 1954 2 Sheets-Sheet 1

INVENTOR.
ROBERT C. RUSSELL
BY Hudson, Boughton,
Williams, David & Hoffmann
ATTORNEYS Nov. 10, 1959  R. C. RUSSELL  2,911,852
TORQUE CONVERTERS
Filed March 29, 1954  2 Sheets-Sheet 2

INVENTOR.
ROBERT C. RUSSELL
BY
ATTORNEYS

United States Patent Office 2,911,852
Patented Nov. 10, 1959

2,911,852

TORQUE CONVERTERS

Robert C. Russell, South Euclid, Ohio

Application March 29, 1954, Serial No. 419,389

2 Claims. (Cl. 74—677)

This invention relates to power transmission devices, and more particularly, to a transmission of the combined hydraulic torue converter and mechanical gear train type in which cooperating relatively rotatable bladed annular members define a toroidal fluid circuit and include turbine members which transmit torque through the gear train to an output shaft.

An object of the invention is to provide an improved transmission of this kind which is of a simple and practical construction, but in which an extended range of torque amplification will be obtainable, as well as a desired high value of torque amplification for the stall or starting condition of operation.

Another object is to provide an improved transmission of this character having a plurality of turbine members connected with an output means through planetary gearing and in which a reaction means inhibited against reverse rotation comprises a reaction member associated with each turbine member.

A further object is to provide an improved transmission of the kind indicated above in which a connecting means connects the reaction members with each other.

Still another object is to provide such an improved transmission in which the connecting means for the reaction members comprises a one-way brake disposed therebetween.

The invention can be further briefly summarized as consisting in certain combinations and arrangements of parts hereinafter described and particularly set out in the claims hereof.

In the accompanying sheets of drawings, forming a part of this specification:

Figure 1:
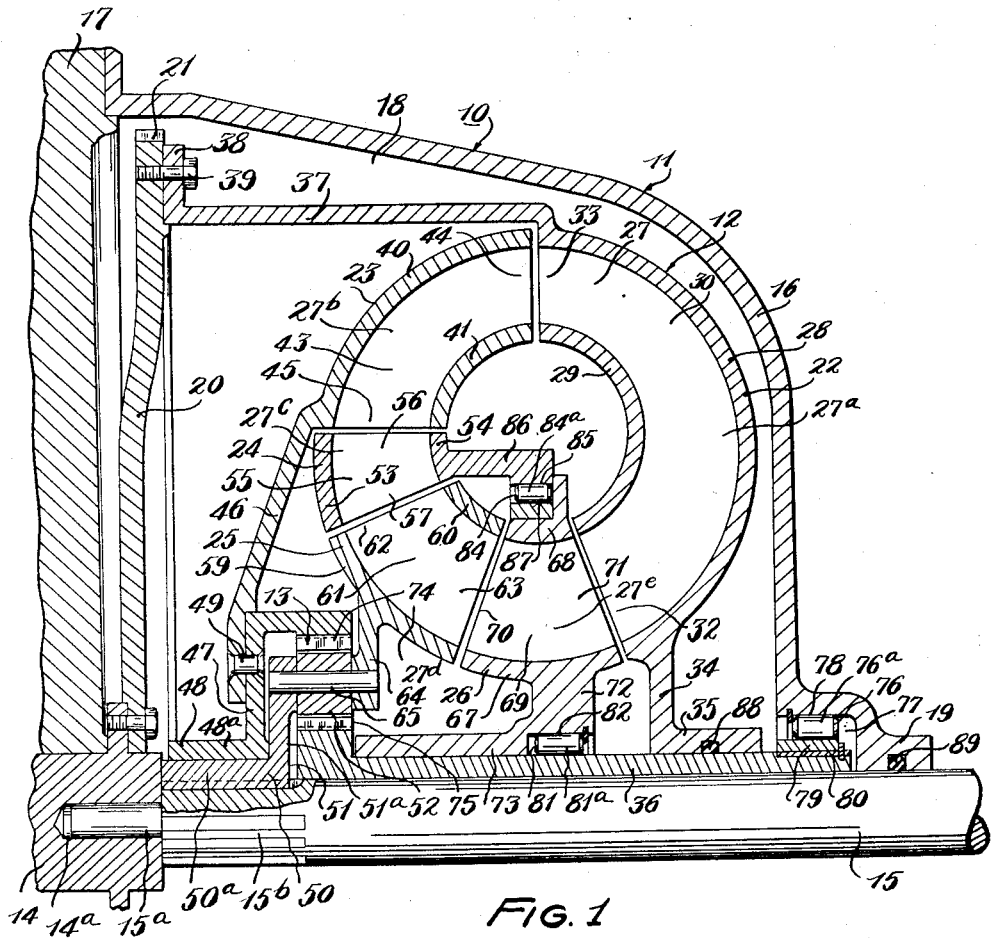
Fig. 1 is a partial vertical axial section taken through a transmission embodying the present invention.

The improved transmission 10 comprises in general a stationary outer housing 11, a torque amplification device or converter 12 of the toroidal fluid circuit type and mechanical torque amplification gearing 13 associated with such torque converter. The transmission 10 also comprises a rotatable power input member or shaft 14 and a rotatable output member or shaft 15.

The stationary outer housing 11 comprises a housing member 16 which is suitably secured to an adjacent structure 17, such as a portion of an internal combustion engine of a vehicle, and cooperates with the latter in defining the chamber 18. The housing member 16 is provided with a central hub portion 19 in which the output shaft 15 is rotatably journalled and through which this snaft member projects from the transmission 10 for connection witn a load to be driven.

The rotatable power input member 14 comprises a driving member, such as the crankshaft of a vehicle engine, and carries a circular flange or flywheel member 20. The flywheel member 20 is located in the chamber 18 and is provided peripherally thereof with gear teeth 21 adapted to be engaged by the driving pinion of a conventional starting motor. The output shaft 15 is rotatably supported in axial alignment with the input shaft 14 and has a reduced inner end portion 15$^a$ journalled in a bearing socket 14$^a$ in the input shaft.

The torque converter 12 comprises a group of relatively rotatable bladed annular members 22, 23, 24, 25 and 26 in cooperating relation and defining a toroidal fluid path or circuit passage 27 interiorly of this device. The member 22 of this group is an annular pump member comprising outer and inner curved annular wall portions 28 and 29 defining a segment 27$^a$ of the toroidal circuit, and an annular group of spaced blades or vanes 30 extending between and connected with such wall portions. One end of the passage segment 27$^a$ of the pump member 22 constitutes an inlet portion 32 through which fluid is admitted into the pump member, and the other end of the passage segment 27$^a$ constitutes a discharge portion 33 through which fluid is discharged from this pump member.

The pump member 22 also comprises a substantially radially extending annular wall 34 having a central sleeve portion 35 disposed in surrounding relation to a sleeve member 36 for rotatably mounting the pump member on the latter. The sleeve member 36 is, in turn, disposed in surrounding relation to the output shaft 15 and extends axially into the chamber 18 from the hub portion 19 of the housing member 16. The pump member 22 is additionally provided with a generally axially extending annular wall 37 by which this member is connected with the flywheel member 20 to be driven by the latter. The axially extending annular wall 37 is provided at its inner or forward end with a radial flange 38 and is connected with the flywheel member 20 by suitable screws 39 extending through this radial flange.

The bladed annular member 23 is a first or primary turbine member comprising curved annular outer and inner wall portions 40 and 41 defining a passage segment 27$^b$ of the toroidal passage 27, and a plurality of spaced blades or vanes 43 extending between and connected to such outer and inner annular wall portions. One end of the passage segment 27$^b$ constitutes an inlet portion 44 which is located adjacent to and receives fluid from the discharge portion 33 of the pump member 22. The opposite end of the passage segment 27$^b$ constitutes a discharge portion 45 through which fluid leaves this turbine member after impingement on the blades thereof.

The turbine member 23 also comprises a generally radially extending annular wall 46 which is connected substantially centrally thereof with the radial wall 47 of a hub member 48, as by means of the rivets 49. A sleeve portion 48$^a$ of the hub 48 is journalled for rotation on an axial sleeve portion 50$^a$ of a hub 50 for rotatably mounting the turbine member 23 on the latter. The hub member 50 constitutes a part of a carrier 51 for a group of planet pinion gears 52, as will be further explained hereinafter, and is drivingly connected with the output shaft 15 by a splined connection 15$^b$ of the sleeve portion 50$^a$ with such output shaft.

The bladed annular member 24 is a first reaction member and comprises curved outer and inner wall portions 53 and 54 defining a passage segment 27$^c$ of the toroidal passage 27, and a plurality of spaced blades or vanes 55 extending between and connected with such outer and inner annular wall portions. This first reaction member 24 has an inlet portion 56 at one end of the passage segment 27ᶜ and is located to receive the fluid from the discharge portion 45 of the first turbine member 23, and at the other end of the passage segment 27ᶜ has a discharge portion 57 through which the fluid leaves this reaction member after impinging on the blades 55 thereof.

The bladed annular member 25 is a second or secondary turbine member and comprises curved outer and inner annular wall portions 59 and 60 defining a passage segment 27ᵈ of the torodial passage 27, and a plurality of spaced blades or vanes 61 extending between and connected with such outer and inner wall portions. One end of the passage segment 27ᵈ of this second turbine member constitutes an inlet portion 62 which is located to receive fluid being discharged from the first reaction member 24 through the discharge portion 57 of the latter. The opposite end of the passage segment 27ᵈ is a discharge portion 63 through which fluid is discharged from this second turbine member after impingement on the blades 61 thereof.

This second turbine member 25 also comprises a substantially radially inwardly extending wall 64 which is connected with the annular radial wall 51ᵃ of the carrier 51 by a plurality of axial pins 65 constituting pivot shafts for the planet pinion gears 52. The radial wall 64 and the pivot shafts 65 constitute a connecting means by which the second turbine member 25 is mounted for rotation in drivingly connected relation with the output shaft 15 through the carrier 51.

The bladed annular member 26 is a second reaction member and comprises outer and inner curved annular wall portions 67 and 68 defining a passage segment 27ᵉ of the toroidal passage 27, and a plurality of blades or vanes 69 extending between and connected with such outer and inner wall portions. One end of the passage segment 27ᵉ constitutes an inlet portion 70 which receives fluid from the second turbine member 25 after impingement on the blades 61 of the latter. The opposite end of the passage segment 27ᵉ constitutes a discharge portion 71 through which fluid is discharged from this second reaction member into the inlet portion 32 of the pump member 22.

The second reaction member 26 also comprises a substantially radially inwardly extending wall 72 having a substantially central axial sleeve portion 73 disposed in surrounding relation to the axial sleeve 36 and mounting the second reaction member 26 for rotation on the latter.

The gearing 13 constitutes reduction gearing or torque amplification gearing of the planetary type comprising a ring gear 74, a sun gear 75 and the above-mentioned planet pinion gears 52 which are disposed between, and have meshing engagement with said sun and ring gears. The ring gear 74 is connected with the first turbine member 23 to be driven by the latter by being formed integral with, or carried by, the hub member 48. The planet pinion gears 52 are rotatably mounted on the pivot shaft 65 of the carrier 51. The sun gear 75 is formed integral with, or carried by, the inner end of the axial sleeve 36.

The sun gear 75 is inhibited against reverse rotation by means of a one-way brake 76 of the roller type located in a recess 77 of the hub 19 of the housing member 16. In addition to the annular group of rollers 76ᵃ, the one-way brake 76 comprises an outer race 78 defined by the inner annular wall of the recess 77, and an inner race ring 79 having a keyed or splined connection 80 with an outer end portion of the sleeve 36 which extends into the recess 77.

The second reaction member 26 is freely rotatable about the sleeve 36 in a forward direction, but is inhibited against rotation in a reverse direction by a one-way brake 81 of the roller type disposed between this reaction member and the sleeve. The rollers 81ᵃ of the one-way brake 81 constitute an annular group and are disposed between an outer race 82 which is formed on, or carried by, the radial wall 72 of the second reaction member and an inner race form on, or carried by, the sleeve 36.

The first reaction member 24 is also freely rotatable in a forward direction, but is inhibited against rotation in a reverse direction by a one-way brake 84 of the roller type disposed between the first and second reaction members. The rollers 84ᵃ of the one-way brake 84 constitute an annular group disposed between an outer race 85 which is formed on, or carried by, an axially extending annular wall 86 of the first reaction member 24 and an inner race 87 which is formed on, or carried by, the inner wall portion 68 of the second reaction member 26.

As shown in Fig. 1, the first and second reaction members 24 and 26 are located in the fluid circuit 27 in an arcuately spaced relation to each other, with the reaction member 24 disposed in the inflow radial zone of the circuit and the reaction member 26 disposed in the inner axial flow zone of the circuit. The first reaction member 24 is also supported by the second reaction member 26 in an overhanging and axially projecting angular relation to the latter.

Leakage of fluid out of the torque converter 12 between the sleeve portion 35 and the inner sleeve 36 is prevented by a suitable packing ring 88 located internally of the sleeve portion 35 and having sealing engagement with the outer surface of the sleeve 36. Leakage of fluid out of the housing structure 11 through the hub 19 thereof is prevented by a suitable packing ring 89 located internally of this hub and having sealing engagement with the surface of the output shaft 15.

From the foregoing detailed description of the transmission 10 it will be seen that when the pump member 22 is driven by the input shaft 14, it will deliver a velocity stream of fluid through the discharge portion 33 of its passage segment 27ᵃ into the first turbine member 23 through the inlet portion 44 of the latter. The velocity of the fluid stream being discharged by the pump member will cause the same to pass in succession through the first turbine member 23, the first reaction member 24, the second turbine member 25, the second reaction member 26 and to be returned by the latter into the inlet portion 32 of this pump member.

During the starting or stall condition of operation, the load with which the output shaft 15 is connected will resist rotation of the first turbine member 23, such that the impingement of the velocity stream of fluid being supplied by the pump member 22 against the blades 43 will be highly effective thereon and will cause the first turbine member to be quickly accelerated. This acceleration of the turbine member 23, acting through the torque amplification gearing 13, will cause a desired heavy starting torque to be supplied to the output shaft 15. The first reaction member 24 has a reaction effect on the fluid stream passing through the first turbine member 23, such as to further amplify the torque output of this turbine member.

During this starting or stall condition of operation and immediately thereafter while the speed of rotation of the first turbine member 23 is increasing, the direction of the fluid stream leaving this turbine member and impinging against the blades 55 of the first reaction member 24 will be such as to tend to produce a reverse rotation of this reaction member. Reverse rotation of the first reaction member 24 is prevented by the one-way brakes 81 and 84, such that the blades of the first reaction member will have the above-mentioned reaction effect for amplifying the torque delivery of the first turbine member 23 and producing the desired high starting or stall torque value. The blades of the first reaction member 24 will also redirect the fluid stream into the second turbine member 25 in a direction to be highly effective on the blades 61 of the latter for causing such second turbine to assist in producing the desired high starting or stall torque.

As the speed of the first turbine member 23 increases further and gradually reaches the speed of rotation of the pump member 22, the torque output of the first turbine member gradually decreases. Likewise, as the speed of rotation of the second turbine member 25 increases, the torque output of this turbine member increases and by the time that the speed of the second turbine member approaches or equals the speed of rotation of the pump member 22, the torque being supplied to the output shaft 15 will be that developed mainly by the second turbine member 25 which thereupon operates substantially as a runner or fluid coupling member and the torque delivery of the first turbine member 23 is then relatively small in value.

While the second turbine member 25 is thus accelerating in speed and effectively delivering torque output to the shaft 15, the stream of fluid passing from this second turbine member into the second reaction member 26 will impinge against the blades 69 of the latter in a direction tending to cause a reverse rotation of this reaction member. Reverse rotation of the second reaction member 26 is prevented by the one-way brake 81, such that the reaction effect of the blades of the second reaction member on the fluid stream will further amplify the torque output being delivered by the second turbine member 25 and thus further increase the above-mentioned desired high starting or stall torque.

By the time that the speed of the second turbine member 25 has increased to a value approaching the speed of rotation of the pump member 22, the direction of the impingement of the fluid stream against the blades of the second reaction member 26 will be such that this reaction member will then tend to rotate in a forward direction, such that when the second turbine member 25 is operating as a fluid coupling member or runner, the first and second reaction members 24 and 26 will then rotate freely in a forward direction at substantially the same speed as the pump and turbine members and which forward rotation is permitted by the one-way brakes 81 and 84.

Thus by providing the reaction members 24 and 26 in immediately adjacent relation to the respective turbine members 23 and 25 and connecting the reaction members with each other through the one-way brake 84, these reaction members produce two important and highly desirable functions. The first of these functions is the amplification of the torque output of the turbine members when the latter are accelerating, as explained above, for producing the desired high value of starting or stall torque output in the output shaft 15.

The other of these functions is that the range of operation or period of time during which amplification of torque is taking place is considerably extended or prolonged. This extension of the torque amplification range results from the fact that the second reaction member 26 can continue to act as a reaction member after the member 24 has ceased to function as a reaction member. Thus when the direction of impingement of the fluid stream against the blades of the member 24 has changed due to the increased speed of the first turbine member 23 and no longer tends to rotate the first reaction member in the reverse direction, the direction of the stream impingement against the blades of the second reaction member 26 may still be such as to tend to cause a reverse rotation of the latter such that it continues to function as a reaction member due to the holding action of the one-way brake 81 while the one-way brake 84 permits the member 24 to rotate freely in the forward direction.

The torque amplification ratio of the gearing 13 can be assumed to be approximately a ratio of 1.6 to 1. The blade shapes and inclinations for the blades of the turbine members 23 and 25 and for the reaction members 24 and 26 are such that the combined effect of the two reaction members in amplifying the torque output developed by the two turbine members is an amplification which may be as high as a 3 to 1 amplification ratio, but for practical purposes, can be here regarded as being approximately a 2.5 to 1 amplification ratio. The total torque thus being delivered to the output shaft 15 during the stall or starting condition of operation will, therefore, be at approximately a $2.5 \times 1.6 = 4.0$ amplification ratio and which is a desired high value of torque amplification.

Figure 2:
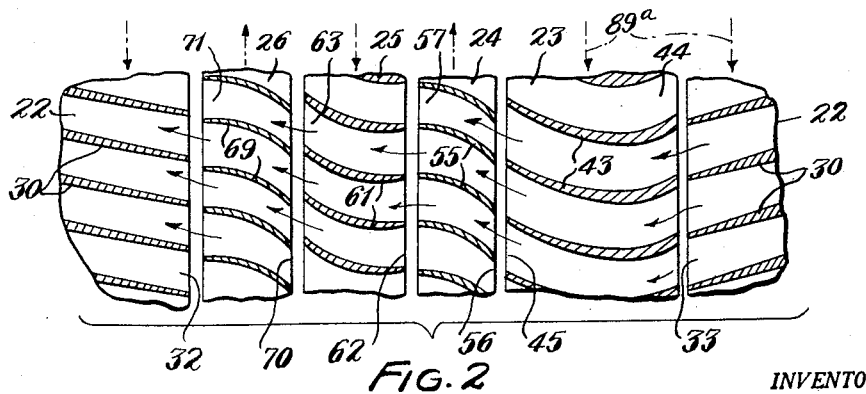
Fig. 2 is a developed fragmentary view of a diagrammatic nature, illustrating the series relation of the bladed members of the toroidal fluid circuit and showing the cross-sectional shapes and relative inclinations for the blades of the respective members.

The blade shapes and inclinations for the blades of the several bladed members of the torque converter 12 are illustrated diagrammatically in Fig. 2, from which it will be seen that the velocity fluid stream being delivered by the pump member will cooperate with the bladed turbine and reaction members to produce the functioning explained above. The arrows 89a indicate the direction in which the rotative force is acting on the bladed members during the above-described starting or stall condition of operation.

Figure 3:
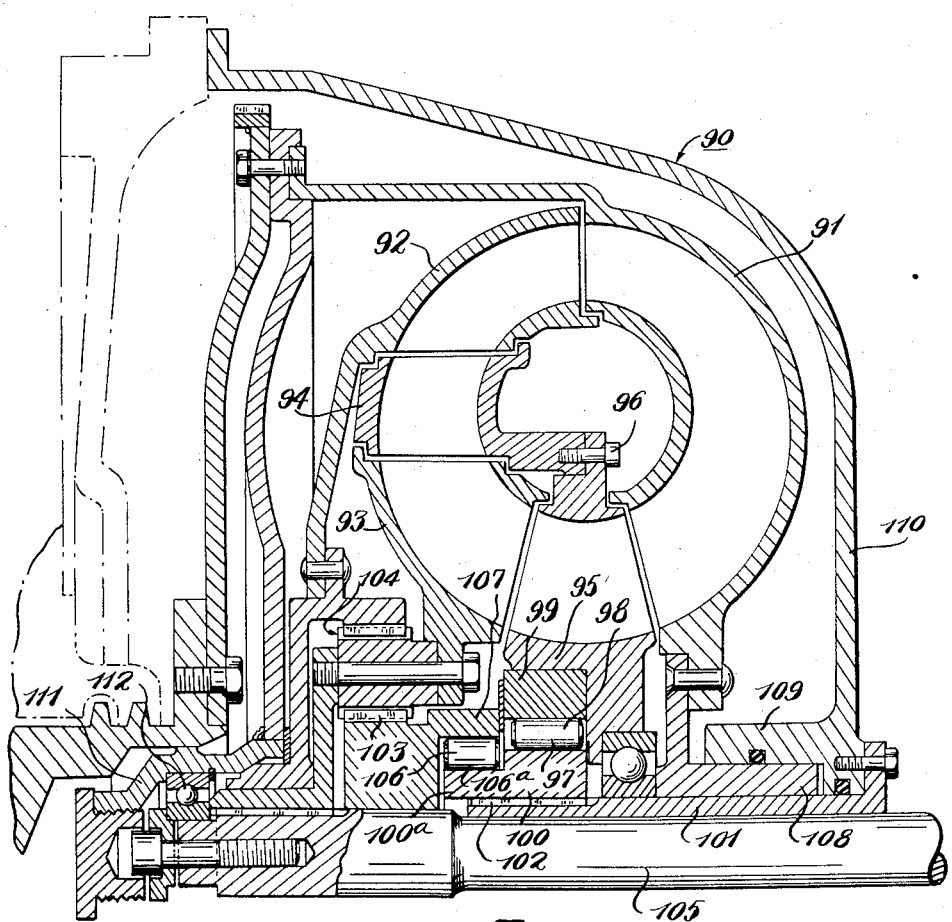
Fig. 3 is a partial vertical axial section similar to Fig. 1 but taken through another transmission and representing a modified form of this invention.

Fig. 3 shows a transmission 90 which is generally similar to the transmission 10 and which, likewise, comprises a group of bladed annular members consisting of a pump member 91, first and second turbine members 92 and 93 and first and second reaction members 94 and 95. In this modified transmission 90, the first reaction member 94 is connected in fixed relation to the second reaction member 95 as by screws 96, such that both reaction members are inhibited against reverse rotation by the same one-way brake 97.

The one-way brake 97 comprises an annular group of rollers 98 disposed between outer and inner annular races 99 and 100, of which the latter race is connected to a fixed sleeve 101 by means of the splined connection 102. The sun gear 103 of the planetary gearing 104 of this modified transmission is supported by the output shaft 105 and is inhibited against reverse rotation by a one-way brake 106 whose annular group of rollers 106a is disposed between an inner race formed by a portion 100a of the brake 97 and an outer race 107 formed by a portion of the sun gear.

In this modified transmission 90, the pump member 91 is supported for rotation, in part, by a hub 108 which is rotatable between the fixed sleeve 101 and the axial sleeve portion 109 of the housing structure 110. The pump member 91 is also rotatably supported, in part, by a hub 111 which is mounted on the inner end of the output shaft 105 by the antifriction bearing 112.

Figure 4:
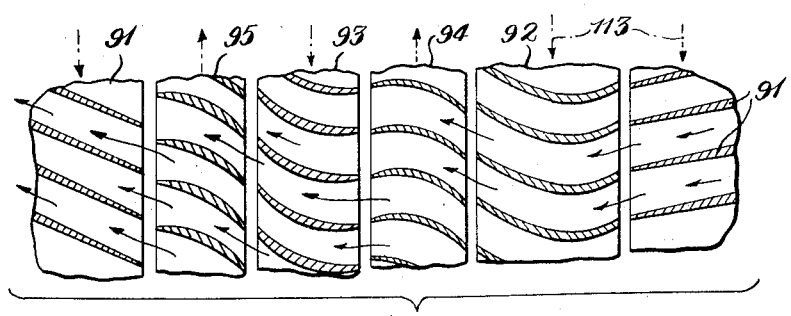
Fig. 4 is a fragmentary developed view of a diagrammatic nature similar to Fig. 2, but showing the series relation of the bladed members of the modified transmission of Fig. 3.

The functioning and torque output of the modified transmission 90 are generally similar to the functioning and torque output of the transmission 10, with the exception that the two reaction members 94 and 95 have fixed connection with each other, such that they are simultaneously inhibited against reverse rotation by the same one-way brake 97 and rotate simultaneously in the forward direction when such a forward direction of rotation of the reaction means is permitted. The diagrammatic illustration of Fig. 4 is generally similar to that of Fig. 2 in that it illustrates in a similar manner the blade shapes and inclinations for the blades of the bladed annular members embodied in the torque converter of the modified transmission. The arrows 113 indicate the direction in which the rotative force is acting on the bladed members during the above-described starting or stall condition of operation.

The first and second reaction members 94 and 95 are provided in substantially the same relative location in the fluid circuit of the transmission 90 as the reaction members 24 and 26 occupy in the fluid circuit 27; that is, the reaction members 94 and 95 are in an arcuately spaced relation to each other in the fluid circuit with the reaction member 94 disposed in the inflow radial zone of the circuit and the reaction member 95 disposed in the inner axial flow zone of the circuit. The first reaction member 94 is also supported by the second reaction member in an overhanging and axially projecting angular relation to the latter.

From the accompanying drawings and the foregoing detailed description, it will now be readily understood that this invention provides a relatively simple yet highly practical construction for a transmission of the toroidal fluid circuit type and in which a desired high torque amplification will be obtainable for the starting or stall condition of operation. Likewise, it will be seen that in this improved transmission, the provision of a plurality of reaction members in association with the respective turbine members will produce a considerably extended range for the torque amplifying action, such that the transmission will function with the desired smoothness and flexibility assuring the delivery of an adequate and continuous flow of torque to the output shaft at all times.

Although the transmission of this invention has been illustrated and described herein to a somewhat detailed extent, it will be understood, of course, that the invention is not to be regarded as being correspondingly limited in scope, but includes all changes and modifications coming within the terms of the claims hereof.

Having thus described my invention, I claim:

1. In a transmission of the hydraulic torque converter type; a housing having a power input and a power output end; a group of co-operating rotatable bladed annular members defining a toroidal fluid circuit in said housing and comprising pump means, first and second turbines, and reaction means inhibited against reverse rotation; rotatable power input means connected with said pump means; a rotatable output shaft; a first hub having a splined connection with said output shaft; a planetary gear train in said housing adjacent said power input end thereof and comprising a ring gear having said first turbine directly attached thereto, a sun gear means inhibited against reverse rotation, and planet pinion means disposed between and in meshed engagement with said ring gear and said sun gear means; a sleeve extending into said housing from said power output end and toward said gear train; said sun gear means being supported by said sleeve; rotatable carrier means supporting said planet pinion means and directly connecting said second turbine with said first hub; and a second hub rotatably journalled on said first hub as a common support for said ring gear and first turbine; said first and second hubs being on one axial side of said gear train and the connection of said carrier means to said second turbine being on the axially opposite side of said gear train; said reaction means comprising first and second reaction members located respectively between said first and second turbines, and between said second turbine and said pump means; said reaction members being disposed in an arcuately spaced relation to each other in said circuit with said first reaction member being in the inflow radial zone of said circuit and said second reaction member being in the inner axial flow zone of said circuit; said first reaction member being connected with and carried by said second reaction member with said first reaction member being in an overhanging and axially projecting angular relation to said second reaction member.

2. A transmission as defined in claim 1 and which also comprises a one-way clutch as the connection between said first reaction member and said second reaction member.

References Cited in the file of this patent

UNITED STATES PATENTS

| | | |
|---|---|---|
| 2,203,177 | Patterson | June 4, 1940 |
| 2,260,015 | Fichtner | Oct. 21, 1941 |
| 2,293,767 | Salerni | Aug. 25, 1942 |
| 2,616,309 | Russell | Nov. 4, 1952 |
| 2,737,827 | Seybold | Mar. 13, 1956 |
| 2,737,828 | Seybold | Mar. 13, 1956 |
| 2,782,659 | Kelley | Feb. 26, 1957 |

FOREIGN PATENTS

| | | |
|---|---|---|
| 1,044,901 | France | June 24, 1953 |